Patented Oct. 11, 1949

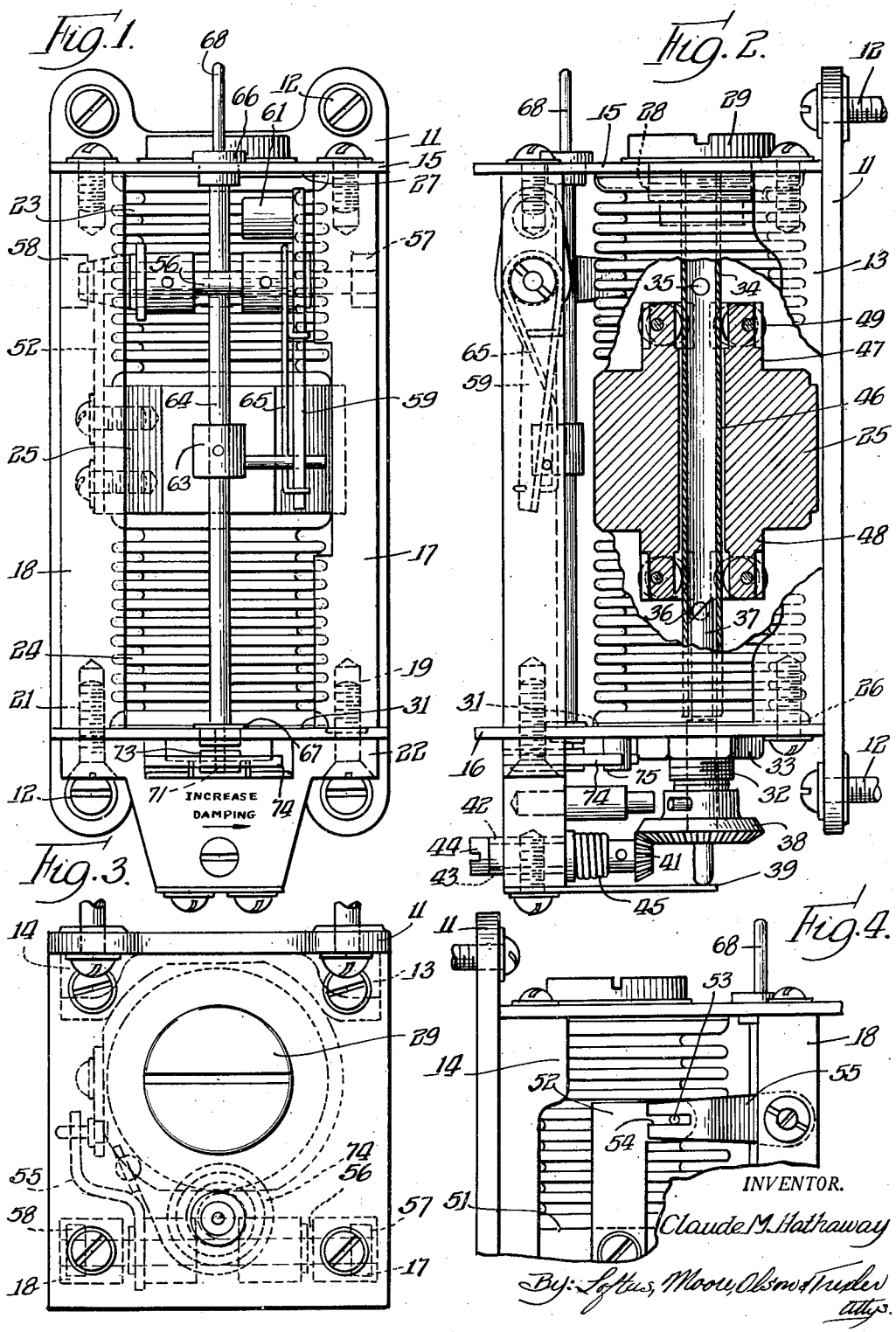

2,484,165

UNITED STATES PATENT OFFICE 2,484,165

ACCELEROMETER

Claude M. Hathaway, Denver, Colo.

Application April 5, 1945, Serial No. 586,787

8 Claims. (Cl. 264—1)

The present invention relates to an acceleration recording apparatus more commonly known as an accelerometer.

In certain types of vehicles and craft it is desirable to obtain an indication of the acceleration and particularly in airplanes it is desired to obtain a record of acceleration. In airplanes a record of the acceleration may be made for the entire flight of the craft. In the case of military craft, the acceleration may vary greatly depending upon the maneuvers through which the craft must operate. In certain of the larger craft a continuous record is kept by automatic recording means of various factors encountered during flight. Among these factors is the factor of acceleration. Since the acceleration on military craft, however, may vary appreciably with different craft and with different missions on which a craft may operate, it is desired to provide an accelerometer suitable for installation in various types of craft which however will have the proper degree of damping so as to obtain an accurate record of the acceleration.

In order to provide for uniformity of records and for a minimum number of types of apparatus for different craft, there is provided in accordance with the present invention, an accelerometer of the mechanical type which is provided with adjustable means for controlling the degree of damping. Therefore if a particular type of craft is to be subjected to high rates of acceleration a greater degree of damping may be provided for the accelerometer than in other craft which will not be subjected to as great acceleration.

It, therefore, is an object of the present invention to provide a simple compact accelerometer for use in obtaining an acceleration record.

It is a still further object of the present invention to provide an improved accelerometer in which the degree of damping may be controlled selectively.

Other and further objects of the present invention subsequently will become apparent by reference to the following description taken in connection with the accompanying drawing wherein Figure 1 is a front view of an apparatus constructed in accordance with the present invention;

Figure 2 is a side view partially broken away to show the interior construction;

Figure 3 is a top view of the apparatus shown in Figure 1; and

Figure 4 is a partial side view showing the side opposite to that shown in Figure 2.

In accordance with the present invention there is provided an accelerometer having a support or mounting frame 11 which is adapted to be secured to a supporting surface in a craft such as an airplane by a plurality of mounting screws 12. Secured in a suitable manner to the supporting plate 11 are a pair of posts 13 and 14 which if desired may be formed as an integral portion of the supporting plate 11. Secured to the top of the posts or post portions 13 and 14 is a top plate 15. Secured to the bottom portions of the posts 13 and 14 is a bottom plate 16. Adjacent the forward edge of the top and bottom plates 15 and 16 are a plurality of posts 17 and 18 and serve to form the main frame of the apparatus. The lower ends of the posts 17 and 18 are secured in position by screws 19 and 21 which pass through a depending apron or bracket portion 22 positioned beneath the bottom plate 16. Between the upper and lower plates 15 and 16 two similar metal bellows 23 and 24 are mounted with an interconnecting weight 25. The outer ends of the bellows 23 and 24 are secured to the upper and lower plates 15 and 16 respectively in a manner as to hold the bellows ends rigidly in position. Any suitable manner of fastening may be utilized.

The upper end of the upper bellows 23 is secured to an end member 27 as for example by soft soldering. The end member 27 has a threaded aperture 28 for receiving the threaded end of a mounting cap screw 29 which extends through a suitable aperture in the top plate 15. The bottom end of the lower bellows 24 is connected to a lower member 31 which is provided with a downwardly extending threaded portion or nipple 32 which passes through a suitable opening in the lower plate 16. The nipple 32 is engaged by a lock nut 33 so as to rigidly secure the member 31 in position relative to the lower mounting plate 16. Mounted between the upper cap screw member 29 and the nipple 32 is a hollow rod 34 having adjacent its upper end an opening 35. Beneath the weight 25 the hollow rod 34 has another opening 36. The opening 36 is adapted to be opened or closed to a certain degree by an adjustable tapered plug 37 which extends through the threaded sleeve or nipple 32 and is engaged by a baffle gear 38. The end of the tapered plug 37 rests upon a leaf spring 39 secured in position in the bottom of the apron or depending bracket 22. The gear 38 is engaged by a baffle gear 41 mounted upon a shaft 42 positioned within a bearing sleeve 43. The shaft 42 is provided with an enlarged slotted head 44 so that the shaft may be rotated by a suitable tool such as a screw driver. Mounted between the bearing 43 and the gear 41 is a biasing spring 45 which maintains the gear 41 in engagement with the gear 48.

The weight 25 mounted between the upper and lower bellows 23 and 24 has a central opening through which the hollow shaft 34 passes. The central opening 46 is provided with sufficient clearance as to preclude any possibility of a frictional contact between the weight 25 and the tube 34. At the top and at the bottom of the weight, extending portions 47 and 48 of the weight are provided for carrying a plurality of radially arranged ball bearings 49. The ball bearings 49 therefore operate to position the weight 25 relative to the central tube or shaft 34 in a manner to provide a minimum of friction when the weight 25 moves in response to acceleration or deceleration. The rotation of the tapered plug 37 by the gear 38 causes the opening 36 to be increased or decreased so that the air which will pass from one bellows to another as the weight 25 moves upwardly or downwardly is controlled. If it is assumed that the weight 25 is moved upwardly the air is compressed in the upper bellows 23 which causes the air to pass through the slight clearance in the opening 46 and through the opening 35 in the hollow shaft 34. The air passing through the opening 35 leaves through the opening 36 and enters into the lower bellows 24. The rate at which the air may pass from one bellows to another therefore controls the degree of damping of the movement of the weight 25. The weight 25 is provided adjacent its left side with a flattened surface 51 to which is secured a bimetal arm 52 having a pin 53 in engagement with a slot 54 in a lever arm 55. The bimetal arm 52 moves the pin 53 deeper in the slot 54 with decreased temperature and thus increases the mechanical ratio of the lever system when the temperature is lowered. This change in the mechanical lever ratio compensates for the increase in elastic modulus or stiffening of the bellows with lowered temperatures. With increased temperatures the arm 52 moves the pin 53 outward in the slot 54.

The lever arm 55 is pivotally mounted on a rotatable shaft 56 carried between two suitable bearing inserts 57 and 58 positioned in the front posts 17 and 18 respectively. The shaft 56 which is journaled between the bearing members 57 and 58 has secured thereto a lever 59 which adjacent its upper end has a counterweight 61. The lower end of the lever 59 engages a lever rod 62 mounted in a collar 63 which is secured to an upright shaft 64. The lever 59 is interconnected with the rod 62 by one end of a spring 65. The shaft 64 is mounted in suitable bearing members 66 and 67 and the top and bottom plates 15 and 16 respectively. The shaft 64 has a reduced diameter portion 68 extending appreciably above the upper plate 15.

The reduced portion 68 of the shaft 64 is adapted to receive a marking lever which engages record paper driven by a suitable mechanism to provide a continuous record of the action of the accelerometer unit.

Since the record driving mechanism and the recording stylus or marking arm do not necessarily constitute a portion of the present invention no further reference thereto need be made since any suitable record driving means and any suitable recording arm, pen, or stylus may be employed.

The shaft 64 also has adjacent its lower end a reduced diameter portion 71 which has secured thereto a collar 73. The collar 73 has connected thereto one end of a spiral spring 74 which has its other end connected to a stud 75 mounted underneath the bottom plate 16. The spiral spring 74 operates to return the shaft 68 to its null or zero position.

The operation acceleration or deceleration acts upon the mass of the weight 25 so as to move the weight upwardly or downwardly so that the pin 53 in the slot 54 produces an angular movement of the lever arm 55. The lever arm 55 rotates the shaft 56 to which is secured the lever arm 59. The lever arm 59 in turn is coupled to the cross pin or lever 62 connected to the vertical shaft 64 which has a reduced end portion 68 extending above the top plate 15 for producing a permanent record.

If the movement of the mass of the weight 25 is too great upon the application of a certain acceleration force, this may be damped by adjusting the member 44 which moves the tapered wedge 37 relative to the air hole 36. If on the other hand a greater degree of sensitivity is desired for certain purposes, the wedge 37 may be adjusted so as to obtain the maximum opening of the hole 36.

While for the purpose of describing and illustrating the present invention, a preferred embodiment has been shown in the drawing, it is to be understood that various modifications may be made therein, and in the instrumentalities and components involved without departing from the spirit and scope of the invention as defined in the appended claims.

This invention is hereby claimed as follows:

1. In an accelerometer comprising a pair of parallel spaced apart support members, a pair of coaxially arranged bellows interconnected by a weight, said bellows being connected to said support members, the combination comprising a hollow shaft extending within said bellows between said support members, a plurality of apertures in said shaft, each aperture being associated with a different one of said bellows, and adjustable means to regulate the effective opening of at least one of said apertures to control the damping of the movement of said weight.

2. In an accelerometer comprising a pair of support members arranged in spaced apart parallel relation, a weight having a central aperture, a pair of bellows each mounted between said weight and one of said support members, the combination comprising a hollow shaft mounted within the aperture of said weight and extending between said support members, said shaft being provided with a pair of apertures, each aperture being associated with a different one of said bellows, adjustable means to regulate the effective opening of one of said apertures, and bearing means mounted on each side of said weight within said bellows and in engagement with said hollow shaft to limit the motion of said weight to either of two opposite directions.

3. An accelerometer comprising a pair of parallel spaced apart horizontal support members, a pair of coaxial bellows connected to said support members, an apertured weight connected between said support members, a shaft mounted within the aperture of said weight in coaxial relation to said weight and said bellows, a plurality of bearings mounted on opposite sides of said weight within said bellows and arranged to engage said weight to limit movement thereof to axial directions with a minimum of friction, a fluid passage interconnecting said bellows, adjustable means for controlling the rate of flow of fluid through said passage including a control mechanism mounted beneath said weight and bellows, means for actuating a record producing element, and mechanical means interconnecting said latter means and said weight.

4. An accelerometer comprising a pair of parallel spaced apart horizontal support members, a pair of bellows arranged coaxially and each secured to one of said support members, a weight mounted between said bellows, guide means for said weight extending between said parallel support members in coaxial relation to said weight and bellows, a plurality of friction reducing bearing members mounted on opposite sides of said weight within said bellows and in engagement with said guide means to limit movement of said weight to axial directions, a coaxial fluid passage within said guide interconnecting said bellows, adjustable means coaxially arranged relative to said weight for controlling the rate of flow of fluid through said passage, and mechanical means connected to said weight for translating reciprocable movement thereof into angular rotary movement.

5. An accelerometer comprising a pair of parallel spaced apart horizontal support members, a pair of bellows arranged in coaxial relation and secured to said support members, a weight interposed between said bellows and secured thereto, guide means extending between said parallel support members in coaxial relation to said weight and bellows, a plurality of bearing members mounted on said weight and in engagement with said guide means to limit movement of said weight to axial directions, a fluid passage within said guide means for interconnecting said bellows, means extending below the lower support member and arranged coaxial to said passage for controlling the rate of flow of fluid through said passage, a rotatable shaft adapted to actuate a record producing element, and mechanical linkage means interconnecting said shaft with said weight whereby said shaft will be moved in proportion to the movement of said weight.

6. An accelerometer comprising a pair of parallel spaced apart horizontal support members, a pair of bellows arranged in coaxial relation and secured to said support members, a weight interposed between said bellows and secured thereto, guide means extending between said parallel support members in coaxial relation to said weight and bellows, a plurality of bearing members mounted on said weight within each of said bellows and in engagement with said guide means to limit movement of said weight to axial directions, a fluid passage within said guide interconnecting said bellows, coxial means within said passage for controlling the rate of flow of fluid through said passage, a rotatable shaft adapted to actuate a record producing element, mechanical linkage means interconnecting said shaft with said weight whereby said shaft will be moved in proportion to the movement of said weight, and means tending to restore said shaft and said weight to null position.

7. In an accelerometer comprising a pair of parallel spaced apart support members, a pair of coaxially arranged bellows interconnected by a weight, said bellows being connected to said support members, the combination comprising a hollow shaft extending within said bellows between said support members, a plurality of apertures in said shaft, each aperture being associated with a different one of said bellows, and adjustable means mounted on one of said support members for regulating the effective opening of at least one of said apertures to control the damping of the movement of said weight.

8. In an accelerometer comprising a pair of parallel spaced apart support members, a pair of coaxially arranged bellows interconnected by a weight, said bellows being connected to said support members, the combination comprising a hollow shaft extending within said bellows between said support members, a plurality of apertures in said shaft each associated with a different one of said bellows, and adjustable means mounted on one of said supports including a rotatable valve member for controlling the effective opening of at least one of said apertures thereby to regulate the damping of the movement of said weight.

CLAUDE M. HATHAWAY.

REFERENCES CITED

The following references are of record in the file of this patent:

UNITED STATES PATENTS

| Number | Name | Date |
| --- | --- | --- |
| 2,194,624 | Titterington | Mar. 26, 1940 |
| 2,317,028 | Chappell | Apr. 20, 1943 |

FOREIGN PATENTS

| Number | Country | Date |
| --- | --- | --- |
| 672,042 | France | Dec. 21, 1929 |